Aug. 13, 1929.  J. A. WRIGHT  1,724,388
VARIABLE SPEED TRANSMISSION AND BRAKE MECHANISM
Filed Dec. 30, 1926  2 Sheets-Sheet 1
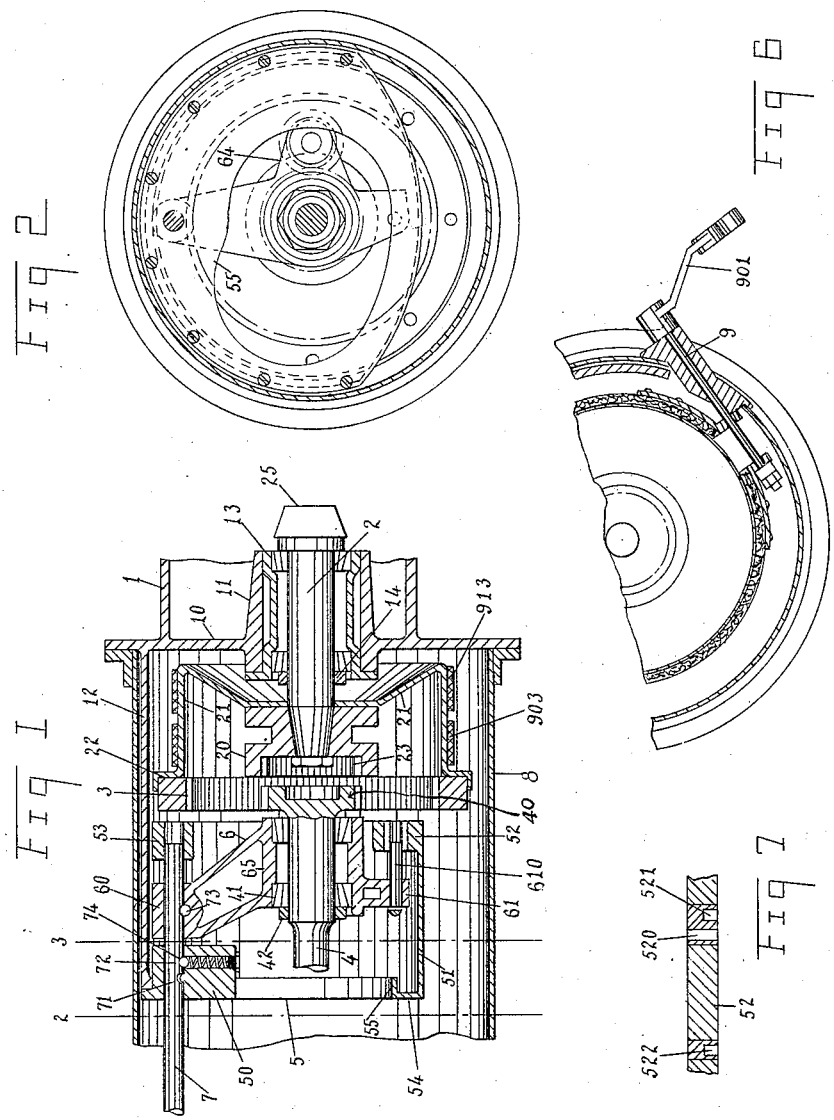
INVENTOR.
JAMES A. WRIGHT.
By
ATTORNEY.

Aug. 13, 1929.   J. A. WRIGHT   1,724,388
VARIABLE SPEED TRANSMISSION AND BRAKE MECHANISM
Filed Dec. 30, 1926   2 Sheets-Sheet 2
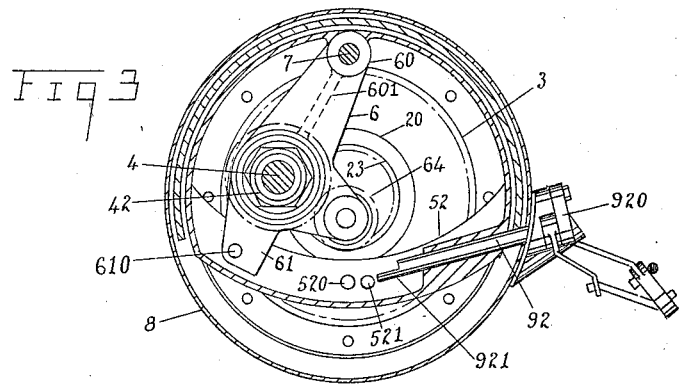
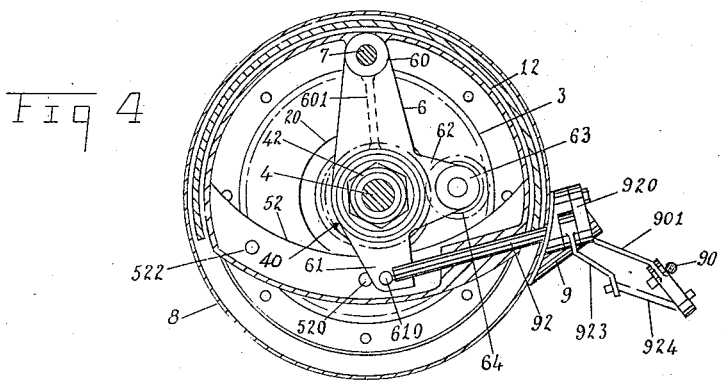
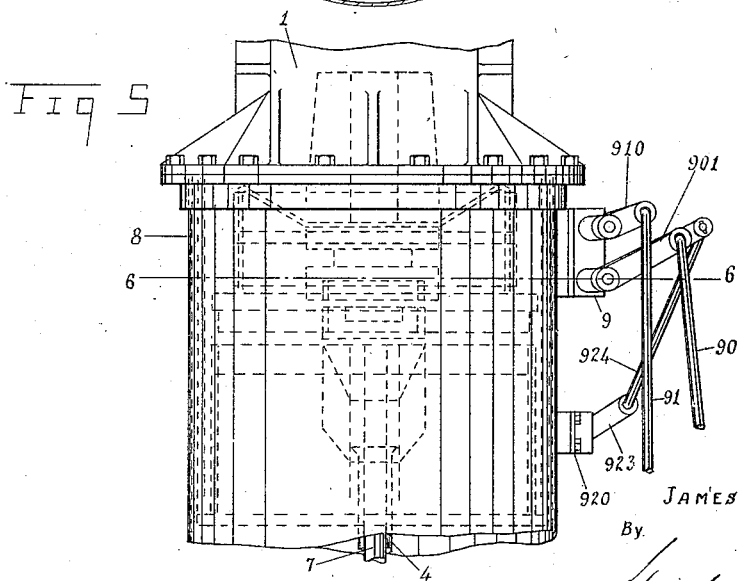
INVENTOR.
JAMES A. WRIGHT.
By
ATTORNEY.

Patented Aug. 13, 1929.

1,724,388

UNITED STATES PATENT OFFICE.

JAMES A. WRIGHT, OF MONTREAL, QUEBEC, CANADA.

VARIABLE-SPEED TRANSMISSION AND BRAKE MECHANISM.

Application filed December 30, 1926. Serial No. 158,054.

This invention relates to improvements in variable speed transmission and brake mechanism for use in motor vehicles.

My improvements are particularly designed for vehicles in which the differential is encased in a casing attached rigidly to the frame, and supported on the wheels by flexible axles.

The invention is specially applicable to a transmission encased in a torque tube connecting the front and rear flexible axles.

The object of my invention is to provide an improved transmission of light weight, efficient operation and simple construction.

A further object is a transmission which ensures safety in operation.

A further object is to provide a combined transmission and brake mechanism.

A further object is to provide a transmission, easily controlled and positive in action.

Further objects will be disclosed in the following specification.

An embodiment of my invention is disclosed by the accompanying drawings to which reference will be made.

In these drawings,

Fig. 1 is a vertical longitudinal section through the axis of the transmission.

Fig. 2 is a vertical cross section on the line 2—2 of Fig. 1.

Fig. 3 and 4 are vertical cross sections on the line 3—3 of Fig. 1 showing the arm in position of low speed and reverse respectively.

Fig. 5 is a top view of the transmission showing the brake and reverse controls.

Fig. 6 is a partial vertical cross section on the line 6—6 of Fig. 5.

Fig. 7 is a cross section of the keeper bar through the apertures.

In Fig. 1 the differential casing 1, has an end wall 10, to which the torque tube 8, is secured. In this wall 10, is the sleeve 11, to contain the roller bearing 13, for the driven shaft 2, secured by the nut 14. At one end of this shaft 2, is the bevel gear 25, to mesh with the differential gear. At the other end of the shaft 2, is the hub 20, with an internally toothed socket 23, adapted to receive the gear wheel 40, on the end of the driving shaft 4, and thereby drive the differential in high gear.

The hub 20, also supports the brake drum 21, on which the brake bands 903 and 913 seat.

The edge 22, of the brake drum 21, is flanged and the internal gear ring 3, is secured to this flange 22.

Extending from the casing wall 10, is a circumferential plate 12, open at the lower side as shown in Figures 3 and 4. This plate 12, is concentric with the torque tube 8, and in close proximity to it.

The transmission frame 5, is secured to the outer end of the plate 12. This frame 5, comprises an enclosing wall 51, bearings 50 and 53, for the control rod 7, a curved keeper bar 52, across the lower inner edge of the wall 51, and a grooved flange 54, around the outer edge of the wall 51, providing the aperture 55, for the lateral movement of the driving shaft 4. Lateral movement of the shaft 4, is provided through flexible couplings to driving gear.

The transmission arm 6, comprises a central sleeve 65, a boss 60, secured to the control rod 7, between the bearings 50 and 53, by the key 73. The arm 6, between the sleeve 65, and the boss 60, is preferably of H section with the web 601, to reinforce that portion of the arm 6. Extending beyond the sleeve 65, is the lock pin branch 61, in which the lock pin 610, is secured. The sleeve 65 is mounted on roller bearings 41 on the shaft 4, secured by the nut 42.

This lock pin 610, is adapted to seat in one of the holes 520, 521, or 522, in the keeper bar 52, when the arm 6, is swung to the proper adjustment and moved longitudinally. The aperture 520, runs through the keeper bar 52, while the apertures 521, and 522, run only partially through as shown in Fig. 7.

Projecting from the side of the bearing sleeve 65, is the idler arm branch 62, carrying the stub spindle 63, on which the idler gear 64, is journalled. This gear 64, meshes with the driving gear 40, and is adapted to mesh with the internal gear ring 3, when the rotation of the driven shaft is to be reversed.

Mounted on the drum 21, are two brake bands 903, and 913. The band 903, is controlled by the lever 901, operated by the foot brake rod 90. The band 913, is controlled by the lever 910, operated by the hand brake rod 91.

In a bearing 920, on the outside of the tube 8, the lock pin 92, is journalled. The lever 923, is keyed to the pin 92, in the bearing 920.

The ends of the levers 923, and 901, are connected by the bar 924, whereby the pin 92, is rotated when the foot brake is set.

The end 921, of the pin 92, is cut away in half.

The end 921, of the pin 92, normally bears on the side of the branch 61, when the arm 6, is in neutral position ready to be set for direct drive or high speed.

When the pin 92, is rotated 45° the arm 6, can be swung to the reverse position as shown in Fig. 4.

With this construction the operation of my invention is as follows:—

The driving shaft 4, is normally held in neutral, coaxial to the driven shaft 2, by the pin 610, entering the aperture 520, a short distance as shown in Fig. 1. The control rod 7, being held by the ball lock 74, in the notch 72.

In order to set the transmission in the direct drive or high speed, the control rod 7, is moved backwardly, bringing the gear wheel 40, into the socket 23, of the driven shaft 2, coupling the two shafts directly, while the pin 610, enters further into the aperture 520, of the keeper bar 52, and the ball lock 74, enters the slot 71, and locks the control rod 7.

To get the transmission in low speed from high, the control rod 7, is pushed forward, passing through the neutral position, bringing the boss 60, up against the bearing 50, and withdrawing the pin 620, from the aperture 520, of the keeper bar.

The driving shaft 4, is then free to be swung sideways to bring the gear wheel 40, in mesh with the internal gear 3, as shown in Fig. 3, and the pin 610, opposite the aperture 522. The control rod 7, is then retracted to lock the pin 610, in the aperture 522, and the ball lock 74, enters the slot 72.

To set the transmission in reverse from either high speed or low speed, the control rod 7, is pushed forward to release the lock pin 610, the foot brake 90, must be first applied to rotate the bar 92, and permit the face 61, of the lever 6, to be swung into the notch 921, and bring the pin 610, opposite the aperture 521, as shown in Fig. 4, bringing the idler gear 64, in mesh with the ring gear 3. The control rod 7, is then drawn backwards to lock the pin 610, in the aperture 521, and the ball lock 74, in the slot 72, of the control rod 7.

In this manner the setting of the transmission is easily and rapidly changed as desired, and when set, is locked until released by the operation of the control rod 7.

The application of the foot brake before the reverse can be set is a measure of safety and protects the mechanism from strain and shock.

The form of the arm 6, and the broad bearing it carries for the driving axle 4, permits the control rod 7, to execute the required movements accurately and without undue force.

The driven shaft being journalled in the wall of the differential casing, gives a very firm bearing for the action of the hand and foot brakes operating on the brake drum mounted on the hub of the driven shaft.

The transmission casing is rigidly held in position within the semi-cylindrical extension of the differential casing and provides a firm setting for the control rod to operate and make its adjustments accurately, through the broad bearing of the driving shaft.

What I claim is:—

1. In a variable speed transmission the combination of a driven shaft geared to the differential, a hub on the end having an axial internally geared socket, a brake drum mounted on the hub and an internally geared ring secured to the edge of the brake drum, with a driving shaft normally axial to the driven shaft but adapted to longitudinal and lateral adjustment, a gear wheel on the end of the driving shaft, an idler gear wheel meshing therewith, and means to adjust the driving shaft gear to mesh directly with the driven shaft, to mesh with the internally geared ring directly and through the idler.

2. In a variable speed transmission the combination of a driving shaft termination in a gear wheel adapted to longitudinal and lateral adjustment, a bearing supported on the adjusting member, an idler gear mounted on the bearing and meshing with the driving shaft gear wheel, with a driven shaft supporting a hub provided with an internally geared socket to receive the gear wheel of the driving shaft, a brake drum secured to the hub and supporting an internally geared ring adapted on adjustment of the driving shaft to mesh with its gear wheel directly and also through the idler gear.

3. In a variable speed transmission having a driving shaft adapted to longitudinal and lateral adjustment, a rocker arm with a boss secured to a control rod, a broad bearing thereon in which the driving shaft is journalled, an idler branch thereto supporting an idler gear, and a locking arm and pin, a keeper plate with perforations adapted to hold the locking arm in the various adjustments, forming part of a casing to the rocker arm, but not to the internal gear on the driven shaft.

4. In a variable speed transmission, the combination of a driven shaft with a brake drum mounted thereon, brake control mechanism, and a lock member coupled thereto, adapted to lock the transmission from being set in reverse before application of the brake.

5. In a variable speed transmission the combination of a driven shaft with a brake drum carrying an internally toothed gear wheel adapted to mesh with the driving shaft gear wheel.

6. In a variable speed transmission the combination of a driven shaft journalled in a sleeve in the wall of the differential casing, having a bevel gear at one end and a hub at the other end, the hub being provided with an axial internally toothed socket, adapted to mesh with the geared end of the driving shaft, and a brake drum mounted thereon, having an internally geared ring secured to the forward edge thereof, adapted to mesh with the driving shaft gear directly and indirectly, with a driving shaft journalled in a sleeve in a rocker arm, secured to and operated by a control rod, and adapted to adjust the geared end of the driving shaft in lateral and longitudinal directions.

7. In a variable speed transmission having a driving shaft adapted to lateral and longitudinal adjustment, a rocker arm secured to and operated by a control rod, journalled in bearings in the rocker arm casing, an idler gear bearing branch projecting from the side of the bearing sleeve of the rocker arm adjacent the end of the driving shaft, with an idler gear thereon in mesh with the driving shaft gear, a locking pin branch on the opposite end of the sleeve forming an extension of the rocker arm, a locking pin thereon adapted to enter the perforations in the keeper bar forming the lower edge of the rocker arm casing.

8. In a transmission of the class specified, a control rod journalled in a rocker arm casing, supported on a cylindrical bracket projecting from the wall of the differential casing, slots in the control rod and a spring ball lock projecting through the bearing of the control rod and adapted to lock the control rod in any of its longitudinal adjustments.

JAMES A. WRIGHT.